United States Patent
Lim

(10) Patent No.: US 7,644,260 B2
(45) Date of Patent: Jan. 5, 2010

(54) FILE UPDATE SYSTEM AND BOOT MANAGEMENT SYSTEM OF MOBILE COMMUNICATION TERMINAL, METHOD OF UPDATING FILE IN MOBILE COMMUNICATION TERMINAL, AND METHOD OF BOOTING MOBILE COMMUNICATION TERMINAL

(75) Inventor: Hyun-keun Lim, Seongnam-si (KR)

(73) Assignee: Pantech & Curitel Communications, Inc., Seoul (KR)

( * ) Notice: Subject to any disclaimer, the term of this patent is extended or adjusted under 35 U.S.C. 154(b) by 716 days.

(21) Appl. No.: 11/258,294

(22) Filed: Oct. 25, 2005

(65) Prior Publication Data

US 2006/0146817 A1    Jul. 6, 2006

(30) Foreign Application Priority Data

Jan. 4, 2005    (KR) .................. 10-2005-0000536

(51) Int. Cl.
G06F 9/00    (2006.01)
(52) U.S. Cl. .......................................... 713/1; 713/100
(58) Field of Classification Search .................. 713/1, 713/2, 100; 717/168, 170; 707/200, 203
See application file for complete search history.

(56) References Cited

U.S. PATENT DOCUMENTS

| | | | |
|---|---|---|---|
| 5,566,314 A | 10/1996 | DeMarco et al. | ............ 395/430 |
| 6,662,186 B1* | 12/2003 | Esquibel et al. | ............. 707/101 |
| 2003/0066062 A1* | 4/2003 | Brannock et al. | ........... 717/169 |
| 2004/0210708 A1 | 10/2004 | Conley | ....................... 711/103 |
| 2005/0004872 A1* | 1/2005 | Gavin et al. | .................... 705/42 |
| 2005/0086198 A1* | 4/2005 | Shimizu et al. | ................. 707/1 |

FOREIGN PATENT DOCUMENTS

EP    0 910 020 A1    4/1999

OTHER PUBLICATIONS

European Search Report; Application No. EP 05 02 1953; Date of Completion Apr. 7, 2006.

* cited by examiner

*Primary Examiner*—Mark Connolly
*Assistant Examiner*—Paul B Yanchus, III
(74) *Attorney, Agent, or Firm*—H.C. Park & Associates, PLC

(57) ABSTRACT

Disclosed are a file update system of a mobile communication terminal which is capable of recovering Same Owner ID Error caused by damage of a file header in an EFS (Embedded File System) area of the mobile communication terminal, a boot management system of a mobile communication terminal which is capable of preventing a fatal error caused by damage of a file header in an EFS area of the mobile communication terminal, a method of updating a file in the mobile communication terminal, and a method of booting the mobile communication terminal which is capable of preventing a fatal error caused by damage of a file header in an EFS area of the mobile communication terminal.

3 Claims, 4 Drawing Sheets

FILE UPDATE SYSTEM AND BOOT MANAGEMENT SYSTEM OF MOBILE COMMUNICATION TERMINAL, METHOD OF UPDATING FILE IN MOBILE COMMUNICATION TERMINAL, AND METHOD OF BOOTING MOBILE COMMUNICATION TERMINAL

BACKGROUND OF THE INVENTION

This application claims the priority of Korean Patent Application No. 2005-00536, filed on Jan. 4, 2005, in the Korean Intellectual Property Office, the disclosure of which is incorporated herein in its entirety by reference.

1. Field of the Invention

The present invention relates to a mobile communication terminal and, more particularly, to a file update system of a mobile communication terminal which is capable of recovering Same Owner ID Error caused by damage of a file header in an Embedded File System (EFS) area of the mobile communication terminal, a boot management system of a mobile communication terminal which is capable of preventing a fatal error caused by damage of a file header in an EFS area of the mobile communication terminal, a method of updating a file in the mobile communication terminal, and a method of booting the mobile communication terminal which is capable of preventing a fatal error caused by damage of a file header in an EFS area of the mobile communication terminal.

2. Description of Related Art

In general, when a file stored in a part of an EFS area of a mobile communication terminal is updated, e.g., modified or relocated, the updated file is not overwritten in the part of the EFS area but is stored in another part of the EFS area. As a result, the updated file coexists in the EFS area together with the file prior to updating.

Meanwhile, each file stored in the EFS area has its own ID which is used to identify each file. An updated file includes a different file name from that of an existing file prior to updating in its header but includes the same ID information as that of the existing file in its header.

If a header of a file block is damaged due to physical or electrical factors while a mobile communication terminal is managing data using EFS, a phenomenon called Same Owner ID Error occurs.

In more detail, the Same Owner ID Error occurs in a case where there are file blocks having the same ID but different file names. In this case, when a mobile communication terminal is powered on, a fatal error occurs during performing a process of initializing EFS in a booting process of the mobile communication terminal. As a result, the mobile communication terminal is automatically power-reset and thus becomes irrecoverable.

SUMMARY OF THE INVENTION

The present invention provides a file update system of a mobile communication terminal which is capable of recovering Same Owner ID Error caused by damage of a file header in an EFS (Embedded File System) area of the mobile communication terminal, a boot management system of a mobile communication terminal which is capable of preventing a fatal error caused by damage of a file header in an EFS area of the mobile communication terminal, a method of updating a file in the mobile communication terminal, and a method of booting the mobile communication terminal which is capable of preventing a fatal error caused by damage of a file header in an EFS area of the mobile communication terminal.

According to an aspect of the present invention, there is provided a file update system of a mobile communication terminal, including: a file reader reading a file to be updated from an EFS area of the mobile communication terminal; an EFS area assignment unit assigning an EFS area for storing an updated file; and an update processor storing an updated file in the EFS area assigned by the EFS area assignment unit, reading old version information from a header of the file to be updated, and recording newer version information than the old version information in a header of the updated file.

According to another aspect of the present invention, there is provided a boot management system of a mobile communication terminal, when a file name is damaged in a header of a file stored in an EFS area so that there are at least two files having the same ID in the EFS area, the boot management system which reads a header of a file of a version preceding to a version of the damaged file, registers the read header in an EFS area table, and boots the mobile communication terminal so that a fatal error caused by damage of the header of the file in the EFS area can be prevented from occurring.

The boot management system may include: a header reader reading a header of a file registered in an EFS area table; an error processor, when a file name is damaged in a header of a file registered in the EFS area table, analyzing header information of files stored in the EFS area, retrieving file names of files having the same ID as that of the damaged file, and recording header information of a file of a newest version among the files having the same ID in the EFS area table, thereby recovering the EFS area table; and a boot processor performing a process of initializing the EFS area table using the EFS area table recovered by the error processor.

According to still another aspect of the present invention, there is provided a mobile communication terminal equipped with the file update system.

According to a further aspect of the present invention, there is provided a mobile communication terminal equipped with the boot management system.

According to another aspect of the present invention, there is provided a method of updating a file in a mobile communication terminal, the method including the operations of: reading a file to be updated from an EFS area of the mobile communication terminal; assigning an EFS area for storing an updated file; and storing an updated file in the EFS area assigned in the operation of assigning an EFS area, reading old version information from a header of the file to be updated, and recording newer version information than the old version information in a header of the updated file.

According to another aspect of the present invention, there is provided a method of booting a mobile communication terminal, the method including the operations of: reading a header of a file registered in an EFS area table; if a file name is damaged in the header of the file registered in the EFS area table, analyzing header information of files stored in an EFS area, retrieving file names of files having the same ID as that of the damaged file, and recording header information of a file of a newest version among the files having the same ID in the EFS area table, thereby recovering the EFS area table; and performing a process of initializing the EFS area table using the recovered EFS area table.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
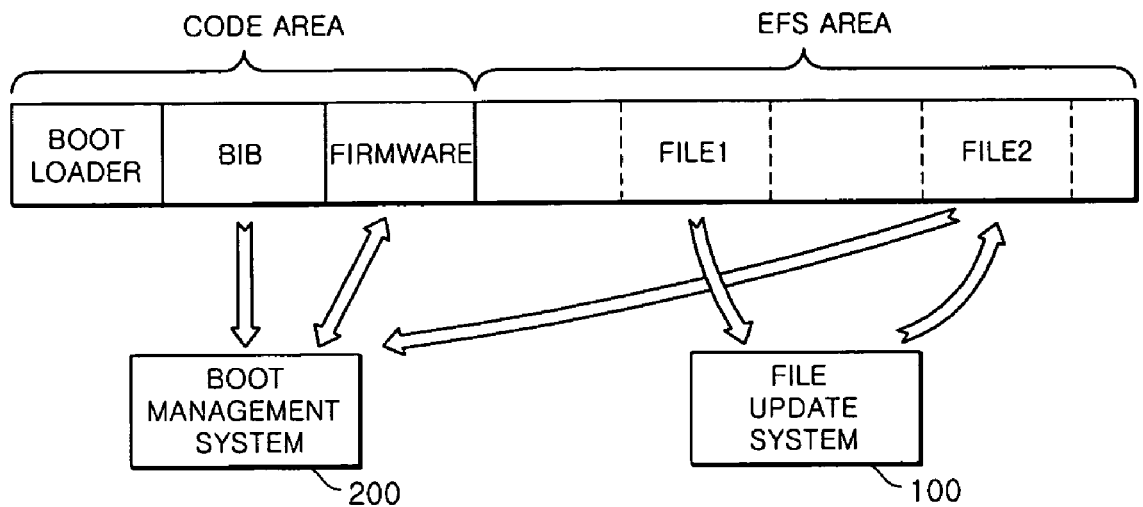
FIG. 1 is a flash memory structure of a mobile communication terminal in accordance with an embodiment of the present invention.

FIG. 1 is a flash memory structure of a mobile communication terminal in accordance with an embodiment of the present invention. A flash memory of a mobile communication terminal includes a code area for storing an operating system (OS) and core applications, which are essential in operating the mobile communication terminal, and an embedded file system (EFS) area for storing short messages, pictures, bell sounds, or games.

The code area of the flash memory of the mobile communication terminal supporting NAND booting typically includes an area for storing a boot loader which is first run to boot the mobile communication terminal upon power-on of the mobile communication terminal, a boot information block (BIB) for storing information referenced by the boot loader, and a firmware area for storing the OS and core applications in a binary form.

A file update system 100 of a mobile communication terminal according to the present invention exists in a software form. The file update system 100 reads a file (file 1) to be updated from an EFS area, assigns an EFS area to store an updated file (file 2) therein, and stores the updated file (file 2) in the assigned EFS area. At this time, the file update system 100 reads old version information from a header (not shown) of the to-be-updated file (file 1), and records newer version information than the old version information on a header (not shown) of the updated file (file 2).

A boot management system 200 of a mobile communication terminal which prevents a fatal error from occurring due to damage of a header of an EFS area exists in a boot loader program run in the mobile communication terminal. The boot management system 200 reads a header (not shown) of a file registered in an EFS area table contained in the BIB of the code area. If a file name is damaged in the header of the file registered in the EFS area table, the boot management system 200 analyzes header information of files stored in the EFS area, and retrieves files having the same ID as that of the file whose file name is damaged. The boot management system 200 records header information of the newest version among the files having the same ID in the EFS area table, thereby recovering the EFS area table.

Figure 2:
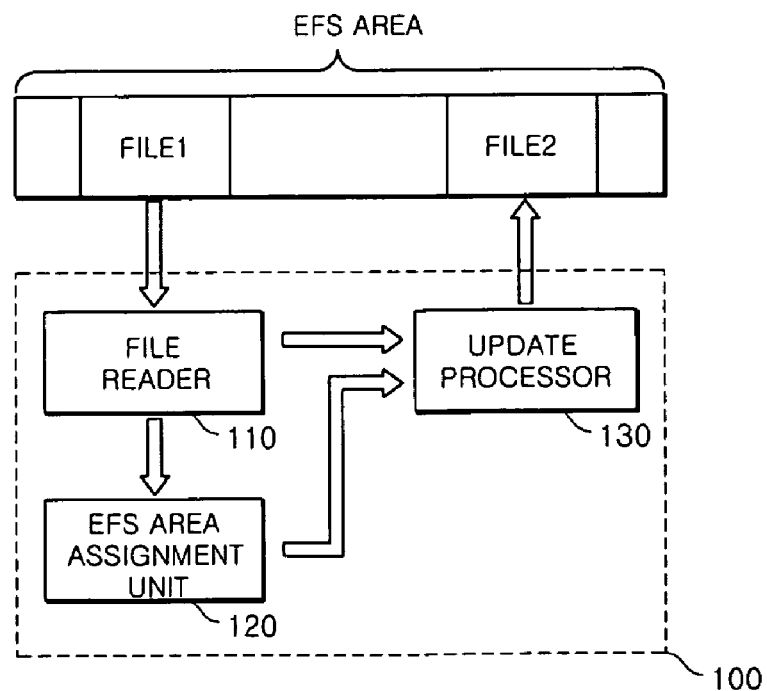
FIG. 2 is a block diagram of a file update system of a mobile communication terminal in accordance with an embodiment of the present invention.

FIG. 2 is a block diagram of a file update system of a mobile communication terminal according to an embodiment of the present invention.

The file update system 100 includes a file reader 110, an EFS area assignment unit 120, and an update processor 130. The file reader 110 reads a file to be updated from an EFS area of the mobile communication terminal.

To update a file stored in the EFS area of the mobile communication terminal, the file update system 100 reads a file to be updated from the EFS area of the mobile communication terminal by means of the file reader 110. The EFS area assignment unit 120 assigns an EFS area to store an updated file.

If the file read from the file reader 110 is updated, the updated file (file 2) is stored in an EFS area different from an EFS area in which the file prior to updating is stored. The file update system 100 assigns an EFS area to store the updated file by means of the EFS area assignment unit 120. Memory assignment technologies are well known in the art and a detailed description thereof will thus be omitted herein.

The update processor 130 stores the updated file read from the file reader 110 in the EFS area assigned by the EFS area assignment unit 120, reads old version information from a header of the to-be-updated file, and records newer version information than the old version information in a header of the updated file.

That is, when the header of the updated file is damaged, the file update system 100 records newer version information than old version information in the header of the updated file by means of the update processor 130 and stores the updated file in the assigned EFS area so that Same Owner ID Error occurred due to the damaged header cannot cause the mobile communication terminal to be automatically power-reset.

Meanwhile, since the version information is recorded in a header of a file stored in the EFS area, when the Same Owner ID Error occurs due to a damaged header, a boot management system 200 of the mobile communication terminal, which prevents a fatal error caused by the damaged header of the EFS area, recovers the Same Owner ID Error using the file prior to updating.

Figure 3:
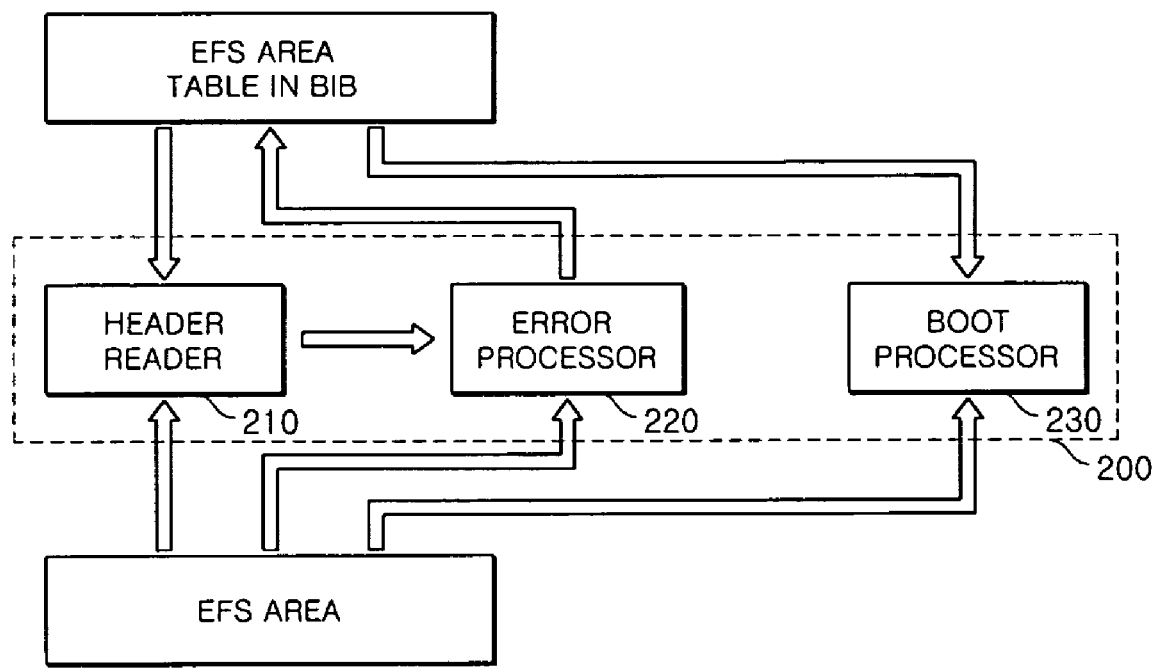
FIG. 3 is a block diagram of a boot management system of a mobile communication terminal in accordance with another embodiment of the present invention, which is capable of preventing a fatal error caused by damage of a file header in an EFS area of the mobile communication terminal.

FIG. 3 is a block diagram of a boot management system of a mobile communication terminal preventing a fatal error caused by damage of a header of an EFS area in accordance with an embodiment of the present invention.

As shown in FIG. 3, when a file name is damaged in a header of a file stored in an EFS area so that there are at least two files having the same ID, a boot management system 200 of a mobile communication terminal according to an embodiment of the present invention reads a header of a file of a version preceding to a version of the damaged file and registers it in an EFS area table so that a fatal error caused by the damage of the header of the EFS area can be prevented from occurring.

The boot management system 200 includes a header reader 210, an error processor 220, and a boot processor 230. The header reader 210 reads a header of a file registered on an EFS area table.

When the mobile communication terminal is powered on, the boot management system 200, which prevents a fatal error caused by damage of a header of an EFS area, performs a process of booting the mobile communication terminal.

The boot management system 200 performs a process of initializing the EFS area table during the booting process. That is, the boot management system 200 reads a header of a file registered on the EFS area table by means of the header reader 210 by making reference to the EFS area table contained in a BIB of a code area.

When a file name is damaged in a header of a file registered on the EFS area table, the error processor 220 analyzes header information of files stored in the EFS area, retrieve file names of files having the same ID as that of the damaged file, and records header information of a newest version among the files having the same ID in the EFS area table, thereby recovering the EFS area table.

If a header of the file registered on the EFS area table is not damaged, the boot management system 200 performs a typical process of initializing the EFS area table using a file of a newest version by means of the boot processor 230.

However, if a file name is damaged in a header of a file registered on the EFS area table, the error processor 220 of the boot management system 200 analyzes header information of files stored in the EFS area, retrieves file names of files having the same ID as that of the damaged file, and records header information of a file of a newest version among the files having the same ID in the EFS area table, thereby recovering the EFS area table.

The boot processor 230 performs a process of initializing the EFS area table using the EFS area table recovered by the error processor 220.

That is, if a header of a file recognized in the EFS area table is not damaged, the boot management system 200 performs a process of initializing the EFS area table using a file of a newest version by means of the boot processor 230.

However, if a file name is damaged in a header of a file registered on the EFS area table, the boot management system 200 performs a process of initializing the EFS area table using the EFS area table recovered by the error processor 220.

Accordingly, the present invention can efficiently recover Same Owner ID Error caused by damage of a file header in the EFS area.

Figure 4:
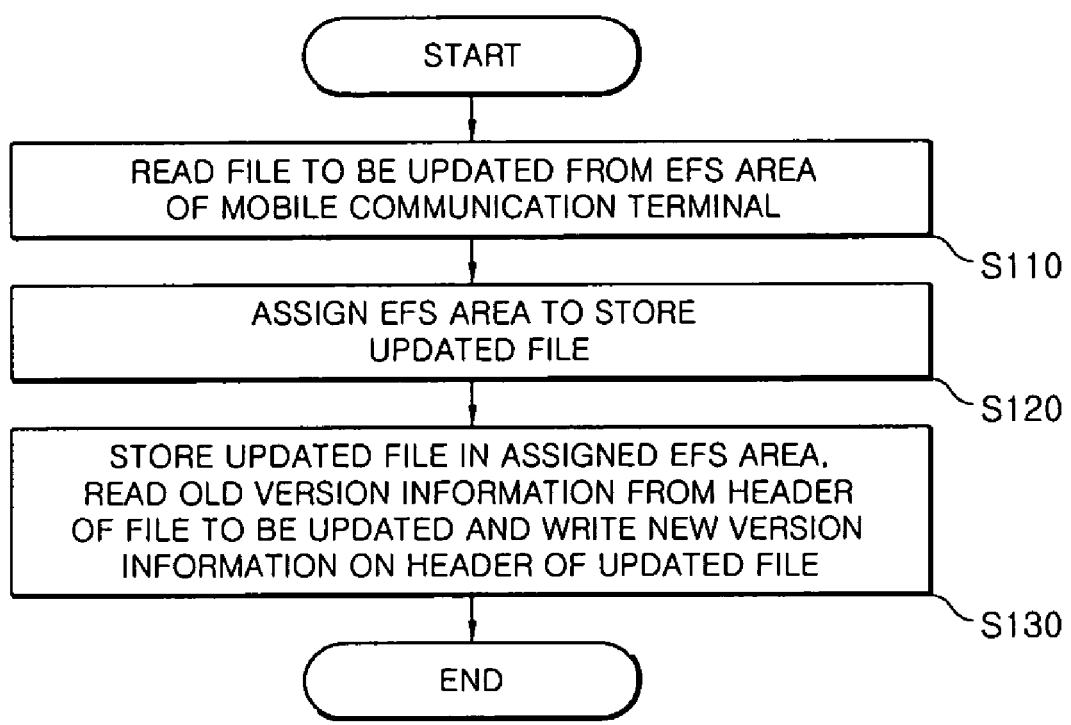
FIG. 4 is a flow chart of a method of updating a file in a mobile communication terminal in accordance with still another embodiment of the present invention.

FIG. 4 is a flow chart of a method of updating a file of a mobile communication terminal in accordance with an embodiment of the present invention.

In operation S110, the file update system 100 reads a file to be updated from an EFS area of the mobile communication terminal.

In operation S120, the file update system 100 assigns an EFS area to store an updated file.

In operation S130, the file update system 100 stores an updated file in the EFS area assigned in operation S120, reads old version information from a header of the to-be-updated file, and records newer version information than the old version information in the header of the updated file.

Figure 5:
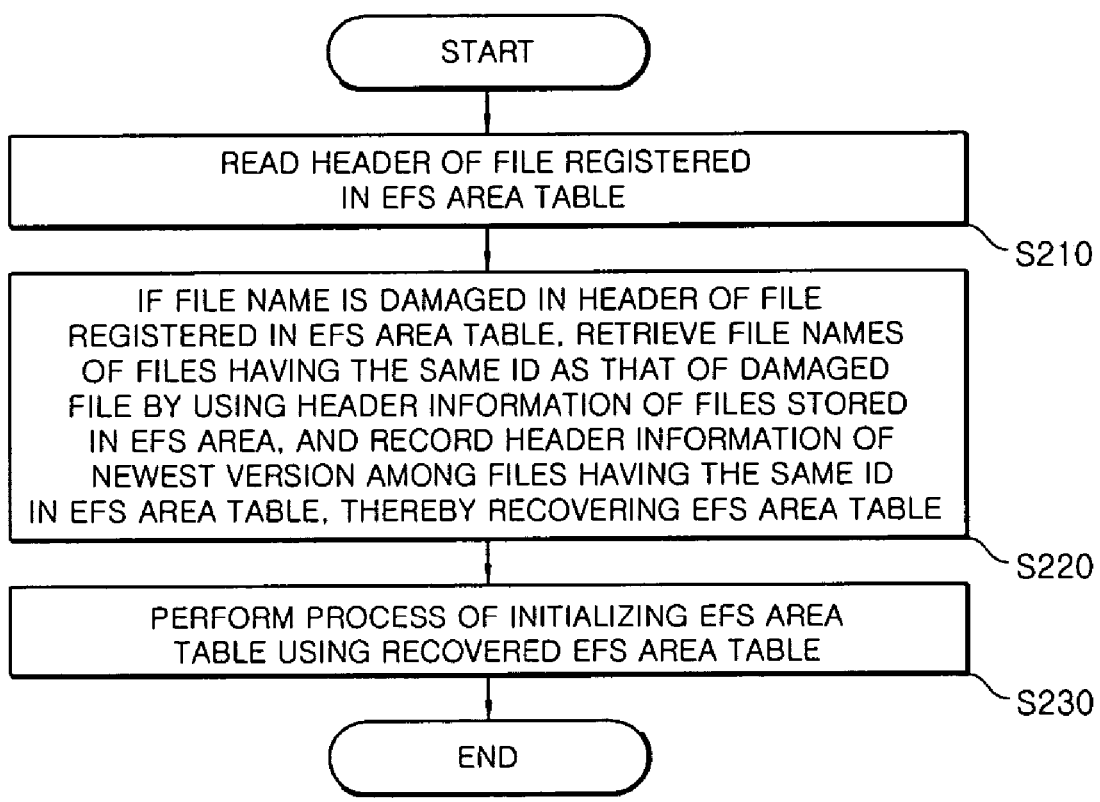
FIG. 5 is a flow chart of a method of booting a mobile communication terminal in accordance with a further embodiment of the present invention, which is capable of preventing a fatal error caused by damage of a file header in an EFS area of the mobile communication terminal.

FIG. 5 is a flow chart a method of booting a mobile communication terminal preventing a fatal error caused by damage in a header of an EFS area in accordance with an embodiment of the present invention.

In operation S210, the boot management system 200 reads a header of a file registered on an EFS area table contained in a BIB of a code area.

In operation S220, if a file name is damaged in the header of the file registered on the EFS area table, the boot management system 200 analyzes header information of files stored in the EFS area, retrieves file names of files having the same ID as that of the damaged file, and records header information of a file of a newest version among the files having the same ID in the EFS area table, thereby recovering the EFS area table.

In operation S230, the boot management system 200 performs a typical process of initializing the EFS area table using the EFS area table recovered in operation S220, thereby recovering Same Owner ID Error caused by damage of the header of the file in the EFS area.

As apparent from the above description, according to the present invention, it is possible to recover the Same Owner ID Error caused by damage of a header of a file in an EFS area of a mobile communication terminal.

While the present invention has been described with reference to exemplary embodiments thereof, it will be understood by those skilled in the art that various changes in form and details may be made therein without departing from the scope of the present invention as defined by the following claims.

What is claimed is:

1. A file update system of a mobile communication terminal, comprising:

an EFS (Embedded File System) area of a mobile communication terminal memory;

a file reader to read a file to be updated from a first region of the EFS area of the mobile communication terminal;

an EFS area assignment unit to assign a second region of the EFS area of the memory for storing an updated file; and an update processor to store the updated file in the second region of the EFS area assigned by the EFS area assignment unit, and if the header of the updated file is damaged, to read old version information from a header of the file to be updated, and to record newer version information than the old version information in a header of the updated file.

2. A mobile communication terminal equipped with the file update system of claim 1.

3. A method of updating a file in a mobile communication terminal, the method comprising the operations of:

reading a file to be updated from a first region of an EFS (Embedded File System) area of the mobile communication terminal;

assigning a second region of the EFS area for storing an updated file; and storing an updated file in the second region of the EFS area, and if the header of the updated file is damaged, reading old version information from a header of the file to be updated, and recording newer version information than the old version information in a header of the updated file.

* * * * *

UNITED STATES PATENT AND TRADEMARK OFFICE
CERTIFICATE OF CORRECTION

| | | |
|---|---|---|
| PATENT NO. | : 7,644,260 B2 | Page 1 of 1 |
| APPLICATION NO. | : 11/258294 | |
| DATED | : January 5, 2010 | |
| INVENTOR(S) | : Hyun-keun Lim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Sixteenth Day of November, 2010

David J. Kappos
*Director of the United States Patent and Trademark Office*